Mar. 3. 1925.  1,528,401

E. L. CHAPPELL

PROCESS OF COLORING CLAY ARTICLES

Filed May 21, 1923

Inventor

Eugene L. Chappell.

By

Attorney

Patented Mar. 3, 1925.

1,528,401

UNITED STATES PATENT OFFICE.

EUGENE L. CHAPPELL, OF NASHVILLE, TENNESSEE.

PROCESS OF COLORING CLAY ARTICLES.

Application filed May 21, 1923. Serial No. 640,523.

*To all whom it may concern:*

Be it known that I, EUGENE L. CHAPPELL, a citizen of the United States, residing at Nashville, in the county of Davidson, State of Tennessee, have invented certain new and useful Improvements in Processes of Coloring Clay Articles; and I do hereby declare the following to be a full, clear, and exact description of the invention, such as will enable others skilled in the art to which it appertains to make and use the same.

This invention relates to processes for treating clay articles, during the baking thereof, and particularly to processes for coloring the articles.

It is well known that the color of brick is due largely to the character of the atmosphere which comes into contact therewith during the process of manufacture and for this purpose the gases arising from a kiln chamber under fire are usually employed but heretofore it has not been customary to subject the articles being cooled to the influence of this gas ladened atmosphere. This present invention has as its object to take advantage of the effect of this gas ladened atmosphere upon the articles which have been burned and which are undergoing the process of being cooled.

It is ordinarily believed that color changes do not take place in bricks, or other clay articles below the temperature of 1300° F., but experiments which I have made lead me to believe that color changes take place at a temperature as low as 900° F.

It is with the object of taking advantage of this fact, that I have produced the process forming the subject-matter of this application.

In the ordinary kiln, such as the continuous kiln, there are provided a series of chambers, in one of which the articles are being fired; in the succeeding chambers there are placed green articles into contact with which the products of combustion pass to preheat them, and in the chamber or chambers, at the other side of the firing chamber articles, which have been fired, are being cooled. The atmosphere passing from the compartment or chambers being fired, is heavily ladened with gases, such gases being capable of having a coloring effect on the articles, especially in the firing and cooling chambers. This gaseous atmosphere affects the cooling articles, when such atmosphere comes into contact with them, but in the ordinary kiln this atmosphere is sucked or drawn through the compartments or chambers to the outer atmosphere. Thus the effect of such gaseous atmosphere, on the cooling articles is lost, or the proper effect not taken advantage of. It is with the purpose of passing this gaseous atmosphere in contact with the cooling articles for coloring them, that the present process deals.

These and other objects will be apparent from the following description when taken in connection with the accompanying drawings.

Figure 1:
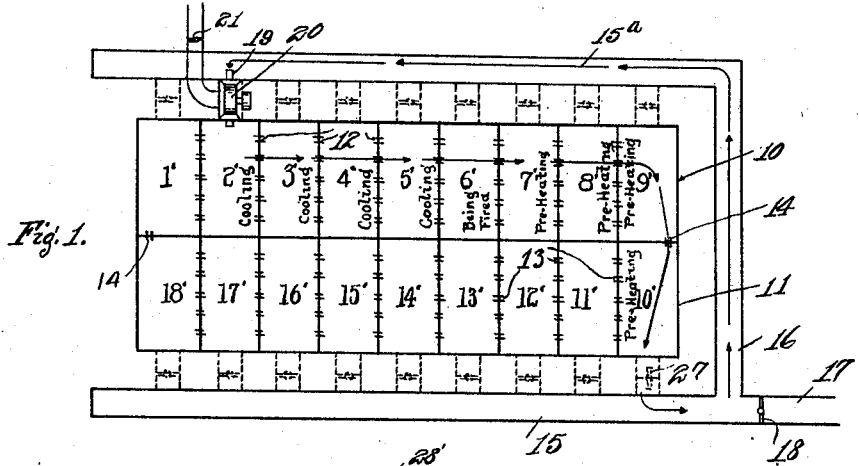
Figure 1 is a diagrammatic view of a kiln showing the process, the view being a plan.

Referring particularly to the accompanying drawing, there are shown two parallel rows of chambers 10 and 11, each containing nine chambers, numbered from 1' to 9', and from 10' to 18', respectively. It will be noted that the first row is numbered from left to right, while the second row is numbered from right to left, which permits a continuous path throughout the two series or rows, chambers 1' to 9' having controllable communications 12 therebetween, while the chambers 10' to 18' have controllable communications 13 therebetween. Controllable communications 14 are arranged between the chambers 9' and 10' and 1' and 18'. Extending longitudinally of each row of chambers, are flues 15 and 15ª, these being connected at one end of the kiln, by a transverse flue 16. From the junction of the flue 15 with the flue 16 an exhaust flue 17 extends, and is connected with a suction fan, (not shown), which is ordinarily used to draw or suck the products of combustion from the chamber being fired through the series of chambers being preheated. In the ordinary construction the products of combustion do not pass in contact with the articles which are being cooled in the chambers 2' to 5', inclusive. The articles in these cooling chambers are hot, and are giving off their heat, as they cool. The introduction of a gaseous atmosphere into these chambers 2' to 5', will have a coloring effect on the articles therein. In the exhaust flue 17 which leads to the suction fan, there is placed a damper 18, which, in the employment of the present process, is closed, so that the gaseous atmosphere is retained within the kiln.

Mounted in the flue 15ª is a pipe 19 which connects with a blower 20 located in the space between said flue 15ª and the series of chambers 1' to 9', the other side of the blower being connected with the chamber 2', in Figure 1. This blower, however, is adapted to be moved along so as to connect with any one of the chambers being cooled and is preferably connected with a chamber which is four or five chambers to the rear of the one being fired. In the illustration, Figure 1, the chamber 6' is represented as being under fire, the chambers 2', 3', 4' and 5' being cooled, and the chambers 7' to 10', inclusive, containing green articles being preheated prior to being fired.

From the above description it will be seen that when the damper 18 is closed, and the blower set in motion, the draft will pass through the chambers 2' to 10', inclusive, out of the chamber 10', to the flue 15, thence into the flue 16, back through the flue 15ª and passed through the blower to the chambers containing the cooling articles. Thus the gaseous atmosphere, which ordinarily is thrown out to the outer air, is retained within the kiln, and its coloring action permitted to work on the cooling articles.

Means are provided, which may be a damper or valve 21, by means of which the blower may introduce a quantity of atmospheric air into the gases, with the result that the coloring effect of the gaseous atmosphere may be controlled, and the color and shade of the resultant clay articles regulated.

It will be understood that, as the articles are preheated, and are burned, they give off a large amount of moisture, which passes along with the gases. This is, however, undesirable, as the drying of the articles is greatly retarded thereby, because of the fact that the moisture would pass in contact with the drying articles. This is obviated by the arrangement shown in Figures 2 and 3. In this form, there is disposed a flue 22, which extends over the kiln throughout the entire length, while the side flues 28 and 28' are connected at both ends by the transverse flues 23 and 24. The intermediate portions of the transverse flues 23 and 24 are connected with the ends of the flue 22 by means of the vertical flues 25 and 26, the former being led outwardly to the outside air, and being provided with a damper 29. In the flue 26 the blower 30 is permanently located and is so mounted that it blows the gases longitudinally through the flue 22. This flue 22 is kept cool in any suitable manner, such as by air, or a surrounding water jacket. It will be noted that this flue 22 is lower at one end than at the other, and at the lowest point there is disposed a valve 22' through which the condensation may be drawn from said flue.

Figure 2:
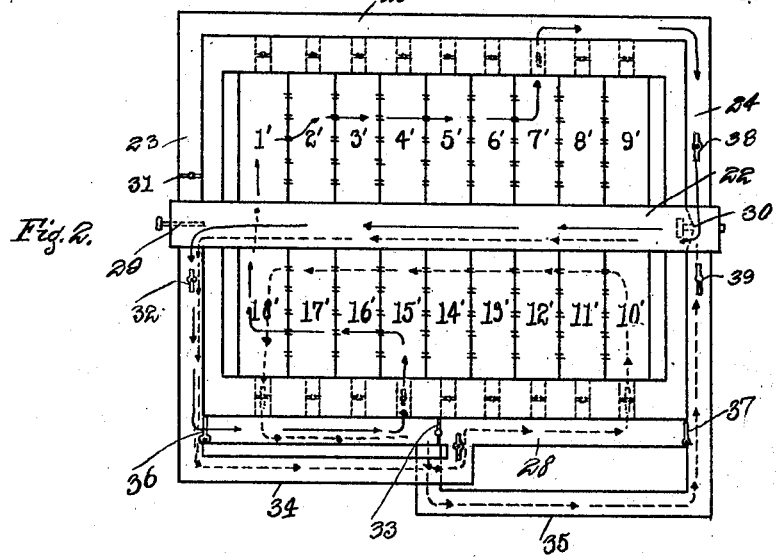
Figure 2 is a vertical transverse section through the kiln, but in diagrammatic form.
Figure 3:
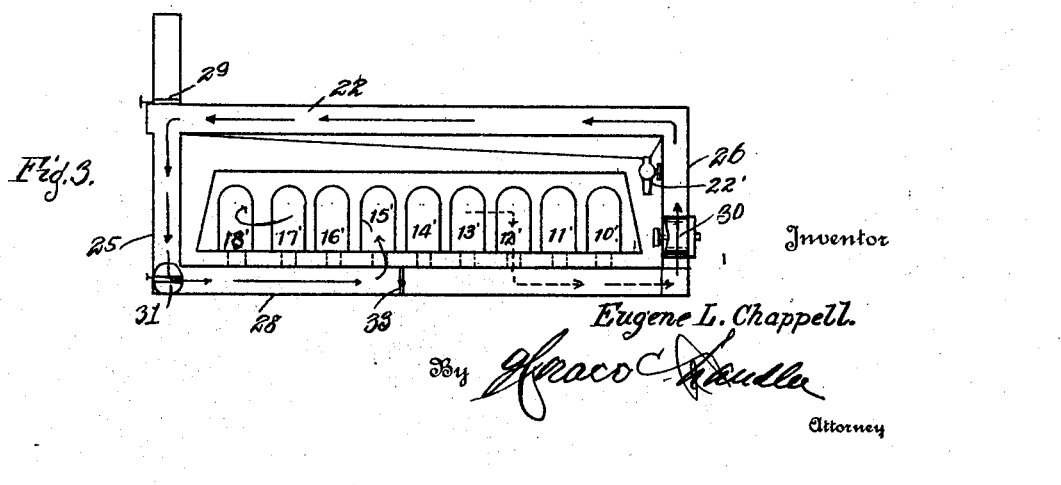
Figure 3 is a vertical longitudinal section of the kiln, but in a diagrammatic form.

In the form shown in Figures 2 and 3, which is the preferred form, it will be assumed that articles are being fired in the chamber 1'. Communication between the chambers 16', 17' and 18' and the flue 28 is closed, while communication between the chamber 15' and said flue is open. Similarly, communication between the chambers 1', 2', 3', 4', 5', and 6' are closed to the flue 28', while the chamber 7' is in communication therewith. In the flue 23 are arranged two dampers 31 and 32, disposed at opposite sides of the vertical flue 25. As thus described, the gases are drawn by the blower, from the chamber 1', through the chambers 2', 3', 4', 5', 6', and 7', out into the flue 28', upward through the flue 26, through the flue 22, down the flue 25, through the flue 23 and the flue 28, into the chamber 15', passage beyond that chamber being prevented by the damper 33. From the chamber 15ª the gases pass through the chambers 16', 17' and 18', and across through the chamber 1, thus making a complete circuit through the chambers which are firing, preheating, and cooling.

It will be further understood that any one or more of the chambers may be fired at the same time, and that any number of chambers may be utilized for cooling and for preheating. Furthermore, the blower, in one instance, is capable of being placed on either side of the series of chambers, and in the other, or preferred form, the blower is capable of driving the gaseous atmosphere around either side of the chambers, by the proper manipulation of the dampers in the large flues.

From the foregoing it will be readily seen that I have produced a process whereby the color of clay articles can be readily and easily controlled and wherein the full use of the gaseous atmosphere is taken advantage of. While I have described the process as used in connection with a continuous kiln, it will be readily understood that the process is applicable to other forms of kilns, such as the tunnel continuous, chamber continuous, and semi-continuous and the like.

Attention is particularly called to the fact that the main feature of the present process consists in retaining the gaseous atmosphere within the kiln, and passing same over the cooling articles, whereby to produce and regulate the color of the finished product in the kiln.

A bypass flue 34 connects, at one end, with the end of the flue 28, while its other end connects with the flue 28 at a point slightly beyond the damper 33. A similar bypass flue 35 connects with the other end of the flue 28, at one end, while its other end connects with the flue 28 at a point at the other side of the damper 33. The latter end of the flue 35 is disposed at a slightly lower level than the corresponding end of the flue 34, to permit the connecting ends thereat to pass each other. At the end of the flue 28 where the flue 34 joins therewith there is disposed a damper 36, and at 37 a similar damper is arranged in the other end of the flue 28, at the point where the flue 35 joins therewith. These flues 34 and 35 are used in the event that firing is being done in one of the chambers 10' to 18', the illustration in Figures 2 and 3 showing the course of the gases when firing is being done in the chamber 15'.

Referring particularly to Figure 2, it will be noted that there are dampers 38 and 39, located in the flue 24, at opposite sides of the lower end of the vertical flue 26, and that these dampers should be open in the event of firing in chamber 14'. Similarly the dampers 36 and 37 are open, so that the first permits direct communication from the flue 23 to the flue 34, while closing communication to the flue 28. The latter damper 37 is open to permit communication between the flues 24 and 35, while closing communication between 28 and 24. The dampers 31 and 33 are closed while the damper 32 is open. Observing the dotted arrows in Figure 2, it will be seen that the gases flow from the chamber 14', which is being fired, through the chambers 15', 16', 17', and 18', thence out into the flue 28, through the flue 35, flue 24, flue 26, flue 22, flue 25, flue 23, flue 34, flue 28, at the far side of the damper 33, into the chamber 10', and thence through the chambers 10', 11', 12', and 13', into the chamber 14' again. It will be understood that clay articles to be preheated are in the chambers 15' to 18', while articles being cooled are in the chambers 10' to 13'.

What is claimed is—

1. A process of coloring bricks and the like, consisting of passing in contact with the cooling bricks, the gasified atmosphere which has passed from the heating and preheating bricks.

2. A process of coloring clay articles consisting in circulating gases from articles being burned into contact with articles being cooled.

3. A process of coloring clay articles consisting in passing the gases from a kiln chamber containing ware being burned through a chamber containing articles being cooled.

4. A process of coloring clay articles consisting in retaining within the kiln the gases from burning and preheating articles and passing such gases into contact with the cooling articles.

5. A process of controlling the reducing conditions in a kiln consisting in drawing the gases from the burning and preheating articles and passing same into contact with the articles being cooled.

6. A process of controlling the reducing conditions in a kiln consisting in retaining the gases from a firing chamber within the kiln, providing means for introducing various proportions of oxygen into the gaseous atmosphere and then passing such atmosphere into contact with the articles being preheated, articles being cooled, and articles being burned.

7. A process of coloring clay articles consisting in passing the gaseous atmosphere from the articles being heated and preheated into contact with the articles being cooled, and removing the moisture from such gaseous atmosphere prior to its passage into contact with the cooling articles.

8. A process of coloring clay articles consisting in passing the gaseous atmosphere from a burning chamber through a preheating chamber and a cooling chamber successively, and finally returning the gaseous atmosphere to the burning chamber.

9. A process of coloring clay articles consisting in passing the gaseous atmosphere from a burning chamber through a cooling chamber, and back through the burning chamber.

10. The process of coloring clay articles consisting in producing repeated circulations of gases from a burning chamber through a cooling chamber and back to the burning chamber.

11. The process of coloring clay articles consisting in producing repeated circulations of gases from a burning chamber through a preheating chamber and through a cooling chamber, and back to the burning chamber.

12. The process of coloring clay articles consisting in repeatedly circulating the gases from a burning chamber through a cooling chamber and back to the burning chamber, and introducing atmospheric oxygen to the gases at the end of each cycle of circulation.

13. The process of coloring clay articles consisting in repeatedly circulating the gases from a burning chamber through a preheating chamber and a cooling chamber and back to the burning chamber, and introducing atmospheric oxygen to the gases at the end of each cycle of circulation.

In testimony whereof I affix my signature in the presence of two witnesses.

EUGENE L. CHAPPELL.

Witnesses:
FRANK L. OMSLEY,
ANDREW C. HULMAR.